Aug. 30, 1927.
E. H. McFARLAND
1,640,463
PROTECTIVE MEANS FOR TURBINE BEARINGS
Filed July 12, 1923
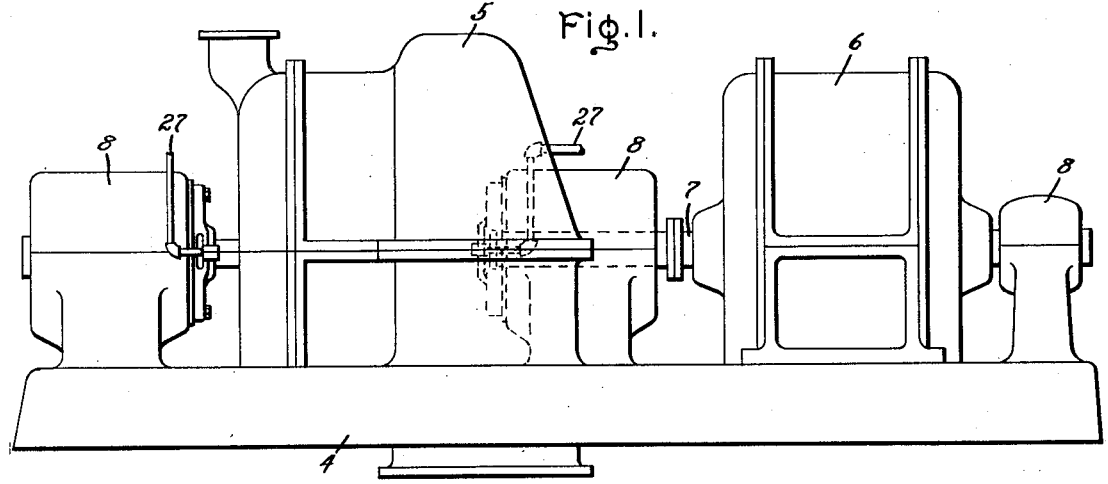
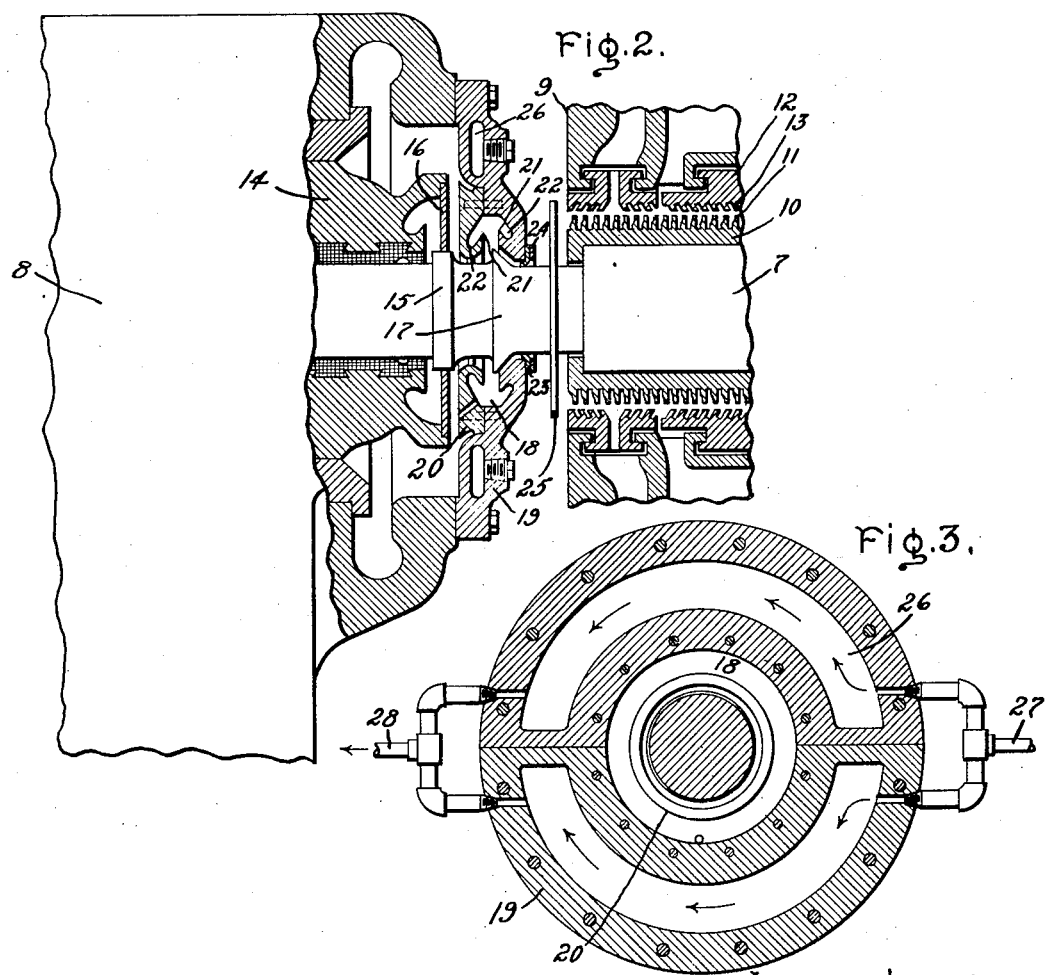
Inventor:
Edward H. McFarland,
by
His Attorney.

Patented Aug. 30, 1927.

1,640,463

UNITED STATES PATENT OFFICE.

EDWARD H. McFARLAND, OF POWER, WEST VIRGINIA, ASSIGNOR TO GENERAL ELECTRIC COMPANY, A CORPORATION OF NEW YORK.

PROTECTIVE MEANS FOR TURBINE BEARINGS.

Application filed July 12, 1923. Serial No. 651,019.

In recent years the increased pressure and temperature of the steam used in turbine driven apparatus, notably of turbo-generator sets, has given rise to excessive heating of the pillow blocks or pedestals of the turbine shaft bearings which in turn increases the temperature of the lubricating oil. This is due to two principal causes, to steam leaking through the shaft packings and to the radiation of heat from the turbine casing. As a result of this the lubricating oil which splashes from the bearing against its support or is thrown from the bearings will, in striking the hot surfaces, be broken down or carbonized. Due to this action the carbonized oil or sludge accumulates until the lubricating system is contaminated, and serious operating difficulties have occurred due to the restriction of the proper oil circulation and to the impairment of the lubricating properties of the oil.

I have invented or discovered a means whereby the above noted objections are overcome and the lubricating oil flowing through the bearings is protected from the injurious effects of heat from outside sources and the temperatures of the oil and of the pillow blocks are reduced.

Briefly stated my invention comprises the feature of maintaining a protecting part or member separate from the turbine and between the bearings and the turbine which by suitable means is kept at a temperature below that at which injury to the lubricating oil can take place.

For a consideration of what I believe to be novel and my invention, attention is directed to the accompanying description and the claims appended thereto.

In the drawing, which illustrates one of the embodiments of my invention, Fig. 1 is a view in side elevation of a turbo-generator; Fig. 2 is a view chiefly in vertical section showing the relation of the turbine shaft bearing and packing, and Fig. 3 is a sectional detail view of my improved protecting means.

4 indicates a base and mounted thereon is a steam or other hot vapor turbine 5 and a generator 6. The shaft 7 for the turbo-generator is carried by suitable bearings which are supported by pedestals or pillow blocks 8.

Referring to Fig. 2, 7 indicates the main turbine shaft and 9 one of the end walls of the turbine casing. Surrounding the shaft is a packing of any suitable character to prevent as fully as possible the escape of steam from the turbine casing. The one illustrated comprises a member 10 rotating with the shaft and having a large number of outwardly extending teeth 11, and a second member 12 which is divided into two or more parts each of which has slanting and inwardly extending teeth 13 co-operating with the teeth 11.

Inside of the pillow block 8 is a bearing 14 of any suitable construction in which the turbine shaft is supported. On the shaft adjacent the right hand end of the bearing is a collar 15 and closely surrounding it is a relatively thin disk 16 carried by the bearing which with the collar act as a retainer to prevent the free escape of oil from the bearing. Owing to the fact that a clearance has to be maintained between the collar and disk a small amount of oil will escape through it and work along the shaft to the oil thrower 17 carried by the shaft. Oil discharged in this manner is caught in the surrounding chamber 18 and allowed to flow back through drain holes into the main chamber in the pillow block. The chamber 18 is formed in a head 19 which is suitably supported, as for example by being bolted to the end of the pillow block adjacent to the turbine. The outer wall of the chamber is formed by the head itself and the inner wall by a separate piece 20 which is bolted or otherwise secured to the head. The inner wall is made in two parts, the plane of division being horizontal to permit of assembly without disturbing the turbine. Since the joint between the part 20 and the main head is on the inside any oil leaking through it will flow back into the main chamber in pillow block. The portions of walls immediately surrounding the oil thrower 17 are provided with lips 21 in the rear of which are gutters 22 which serve to carry the oil to the sides and away from the perpendicular plane of the oil discharged by the thrower. Surrounding the outer opening in the wall of the chamber 18 is a thin oil guard 23, in this case copper, which is held in place by a ring 24 that is bolted to the head. To the right of this and carried by the shaft is an oil deflector disk 25 which serves as an additional means to catch any oil that may escape through the devices between it and the bearing, and which also outwardly deflects any steam which may escape from the packing.

Obviously the heat from the turbine due to steam leakage and radiation would heat the head 19 to an undesirable degree and cause injury to the lubricating oil unless means are provided to prevent it. To this end the head is provided with a relatively large cooling chamber 26 through which cooling water is constantly circulated when the machine is in operation. In order that the head may be mounted in position or removed without disassembling the machine, it is made in parts. As shown in Fig. 3 the head is made in two parts, divided in a horizontal plane and for this reason the cooling chamber is also made in two parts. By preference the chamber 26 is cored in the casting since by so doing the necessity of maintaining tight joints is avoided and there is no opportunity for the cooling water to escape and enter the oil chamber in the pillow block. Water is admitted to the cooling chamber by the pipe 27 and flows in multiple paths through both parts of the chamber 26 and escapes by the pipe 28. In practice, I have found cool condensate to be a satisfactory fluid for cooling the head. Since the head is kept at a suitably low temperature by the cooling water it follows that the oil splashed or thrown thereon instead of carbonizing on striking the parts of the head, will retain its normal condition and flow back to the source of supply for further use. The absorption of heat by the cooling fluid in addition to preventing injury to the oil also reduces the temperature of the bearing and of the oil to a substantial extent.

Mounting the cooling head on the pillow block, as distinguished from mounting it on the turbine casing, has the material advantage that only a relatively small amount of heat has to be dissipated and hence the amount of cooling fluid required is limited. Furthermore, all danger of distorting the turbine casing by having a relatively cool zone around the shaft is avoided.

In addition to eliminating the trouble heretofore existing due to carbonization, etc. of the lubricating oil, my improved construction has the distinct advantage that it can be applied to existing machines at a small cost at the point of installation and does not require appreciable modification of their construction.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. In combination, a turbine and its shaft, a packing for the shaft, a bearing for the shaft, a pillow block for the bearing, a head carried by the pillow block and located between it and the packing, said head having a cooling chamber and also a second chamber to receive lubricating oil from the bearing, means for circulating a cooling medium through the first-named chamber, and an oil thrower carried by the shaft and located in the second chamber.

2. In combination, a turbine and its shaft, a bearing for the shaft, a pillow block which supports the bearing, an oil retaining disk carried by the bearing which closely surrounds the shaft, a head carried by the end of the pillow block adjacent the turbine which is provided with an outer cooling chamber and an inner oil receiving chamber, means for passing a cooling fluid through the outer chamber, an oil thrower carried by the shaft and located within the inner chamber, and an oil guard carried by the head on the side adjacent the turbine.

3. The combination with an elastic fluid turbine having a casing and a shaft extending therefrom, of a bearing for the shaft, a pillow block for the bearing axially separated from the casing by an air space, means providing a wall between the pillow block and the casing, said wall being mounted out of contact with the casing, and means for cooling said wall.

4. The combination with an elastic fluid turbine having a casing which becomes heated in operation and a shaft which extends exteriorly of the casing, of a bearing for the shaft which is mounted separately from and in axially spaced relation to the casing, protective means for the bearing which includes a wall mounted separately from the casing and in axially spaced relation thereto adjacent said bearing, and means for cooling said wall.

5. The combination with an elastic fluid turbine having a casing which becomes heated in operation and a shaft which extends exteriorly of the casing, of a bearing for the shaft, a pillow block for the bearing which is separately mounted with respect to the casing and separated from said casing by an air space, and a head for said pillow block which surrounds the shaft between said mounting means and the air space, said head being secured to the pillow block as a protective cover therefor and comprising a wall, a cooling chamber adjacent said wall through which cooling medium may be passed, and a second chamber surrounding the shaft for collecting lubricant therefrom.

6. The combination with an elastic fluid turbine having a casing and a shaft extending therefrom, of a bearing for the shaft, a pillow block for the bearing spaced axially and separate from the casing, a head for the pillow block having parts which form a protective wall for the bearing, and means providing a separate fluid conduit through each of said parts.

In witness whereof I have hereunto set my hand this 11 day of July, 1923.

EDWARD H. McFARLAND.